C. H. TONDEUR.
RESILIENT TIRE.
APPLICATION FILED MAR. 18, 1918.
1,319,539.
Patented Oct. 21, 1919.
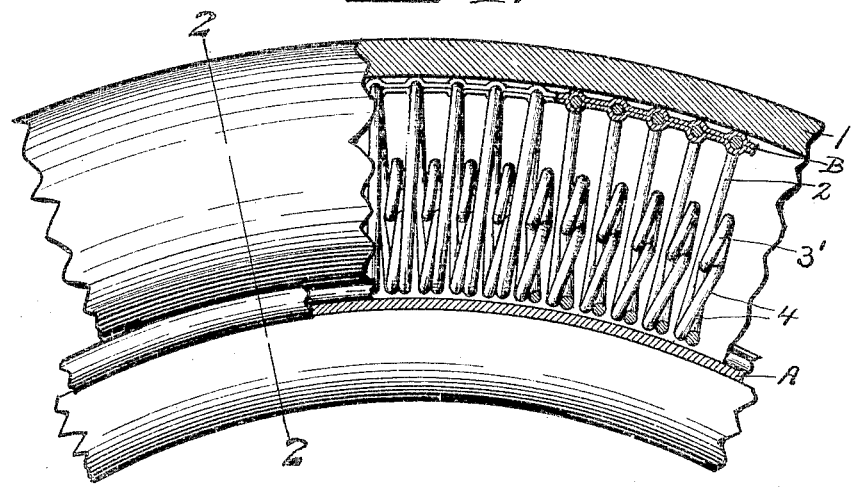
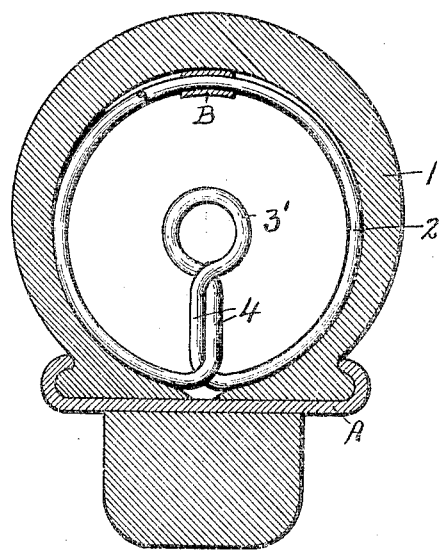
WITNESSES:
INVENTOR
ATTORNEY.

UNITED STATES PATENT OFFICE.

CLEON H. TONDEUR, OF CANASTOTA, NEW YORK.

RESILIENT TIRE.

1,319,539.  Specification of Letters Patent.  Patented Oct. 21, 1919.

Application filed March 18, 1918. Serial No. 223,077.

*To all whom it may concern:*

Be it known that I, CLEON H. TONDEUR, a citizen of the United States of America, and a resident of Canastota, in the county of Madison, in the State of New York, have invented new and useful Improvements in Resilient Tires, of which the following, taken in connection with the accompanying drawings, is a full, clear, and exact description.

This invention relates to certain improvements in resilient tires for vehicle wheels involving the use of a continuous coil spring in the usual outer shoe or casing in place of an inner inflatable tube, so as to avoid accidental collapse of the casing by puncture or other injury.

The main object is to provide the usual outer shoe or casing (commonly used with pneumatic tubes) with an inner distending spring coil, the adjacent convolutions of which are connected by relatively small coils in such manner as to allow the main convolutions to yield under load, and at the same time to connect said convolutions in such manner as to limit the spreading of opposite sides thereof.

Other objects and views will be brought out in the following description.

In the drawings:

Figure 1 is a side elevation, partly in section, of a portion of my improved tire.

Fig. 2 is a transverse sectional view taken on line 2—2 Fig. 1.

This tire comprises an outer shoe or casing —1— of the type commonly used with inner inflatable tubes and known as pneumatic tires adapted to be mounted upon the periphery of a clencher or equivalent rim —A— but in the present instance is normally distended by a coil spring —2— extending the entire length of and within the shoe or casing —1— and having an exterior transverse diameter substantially equal to the transverse inner diameter of said casing.

It will be noted that all portions of the several convolutions of the spring are free to yield thereby reducing to a minimum the liability of crystallization and breakage of the spring.

The rim-sides of the several convolutions are provided with out-turned radial extensions or arms —4— merging into the relatively small supplemental coils —3'— some distance from the tread sides of the main convolutions and preferably at substantially the transverse center thereof, the radial arms —4— being looped around one another to limit the lateral expansion of said convolutions and also to allow the inner or rim-sides thereof, to yield under varying loads, so as to distribute more or less of the load to the more resistive smaller coils —3'—.

It is now apparent that the major portions of the convolutions will readily yield under the lighter load and that as the load increases it will be transmitted through said major portions to the smaller coils 3' thereby causing an automatic adjustment for resiliency according to the load, allowing the several convolutions including the smaller coils to flex throughout their lengths and avoiding transverse sliding action of the tread portions of the spring across the tread portions of the casing all of which adds materially to the efficiency and permanency of the tire.

Furthermore these springs by reason of their flexibility, may be easily and quickly inserted or removed through the open inner side of the casing in a manner similar to that required for the insertion and removal of the usual inner inflatable tube.

The outer tread portions of the convolutions are tied together by a circumferentially extending band —B— of canvas or equivalent material having loops around the adjacent portions of the several convolutions to hold them against circumferential spreading.

What I claim is:

1. An elastic tire comprising an outer shoe or casing divided longitudinally through its inner side, a coil spring having main convolutions fitting within said casing, each convolution having portions thereof bent toward the center of the coil and looped around one another to prevent undue spreading of the remaining portions.

2. An elastic tire comprising an outer shoe or casing, a coil spring extending circumferentially of and within said casing, the rim portions of adjacent convolutions having outturned arms looped around one another and merging into relatively small coils.

In witness whereof I have hereunto set my hand this 5th day of March, 1918.

CLEON H. TONDEUR.

Witnesses:
H. E. CHASE,
ALICE M. CANNON.